June 27, 1967  ERWIN-WALTER SIBER ET AL  3,327,798
TRACK LAYING VEHICLE
Filed Feb. 11, 1966  4 Sheets-Sheet 1
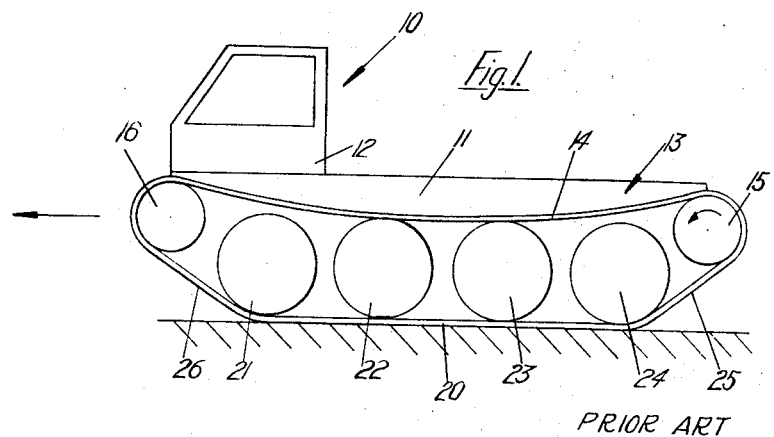
PRIOR ART
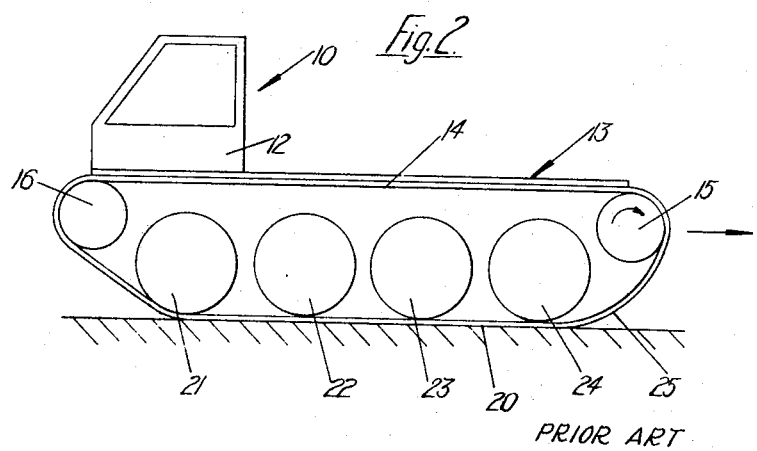
PRIOR ART
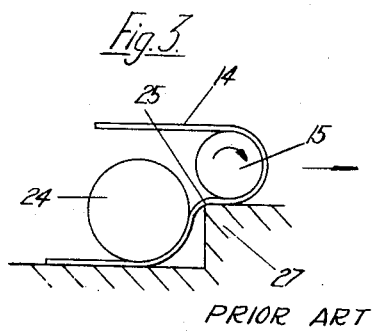
PRIOR ART
Inventors
Erwin-Walter Siber
Marvin William Keary
By
Cushman, Darby & Cushman
Attorneys

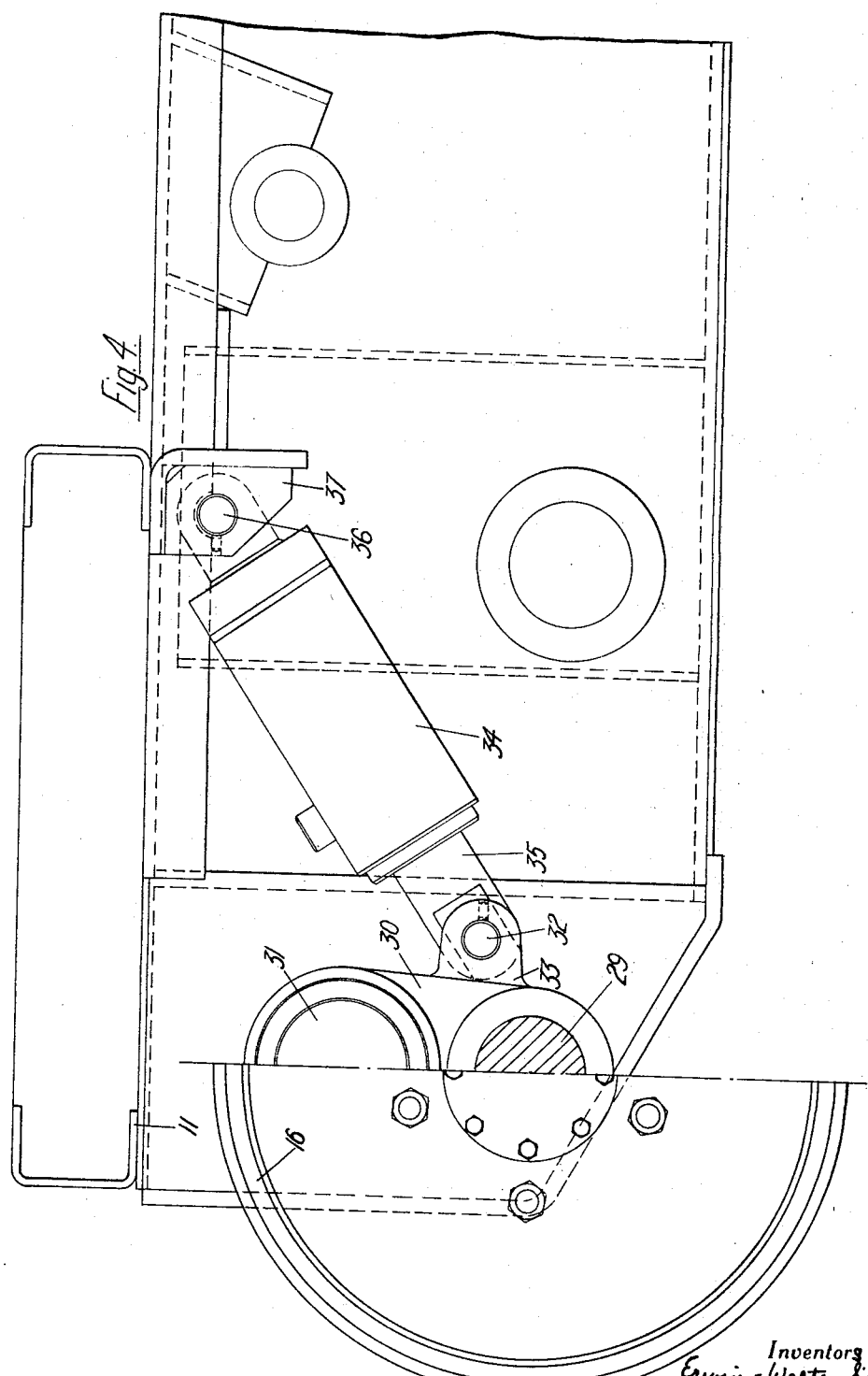

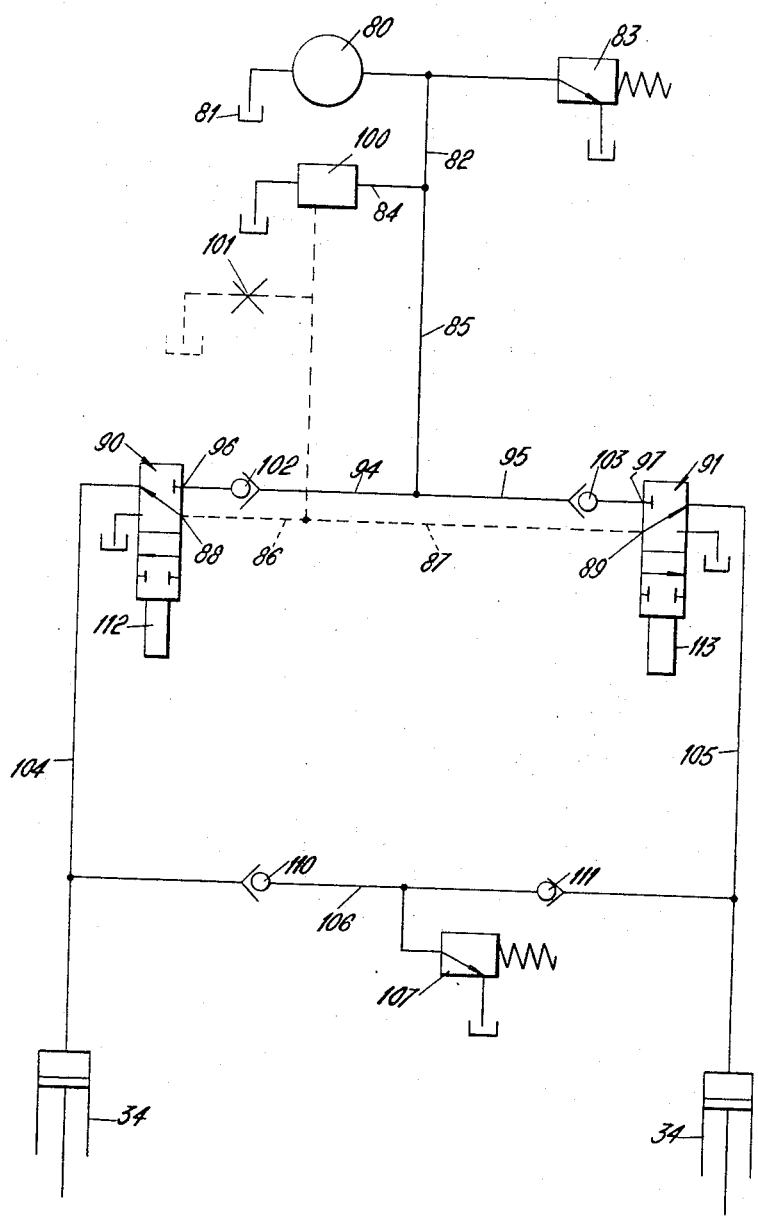

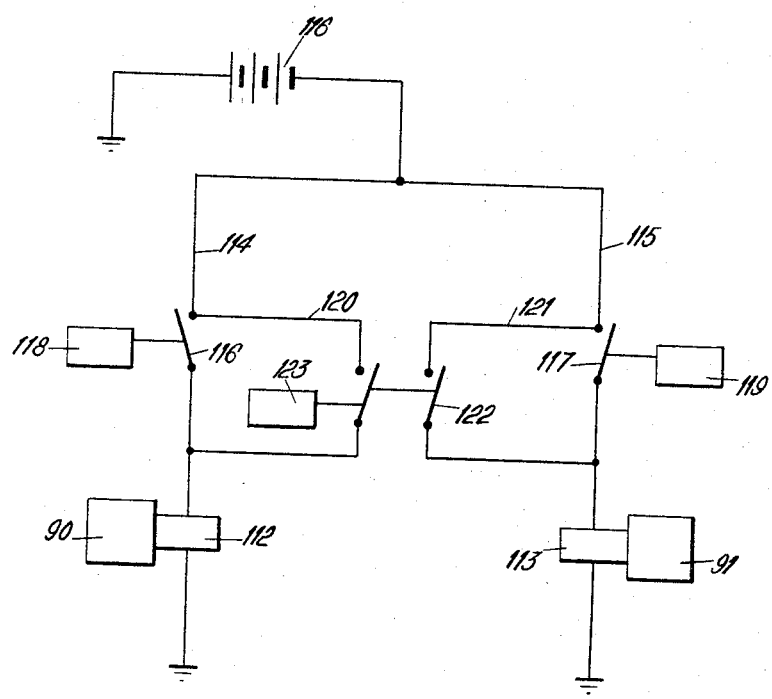

United States Patent Office 3,327,798
Patented June 27, 1967

3,327,798
TRACK LAYING VEHICLE
Erwin-Walter Siber, Beaconsfield, Quebec, and Marvin William Keary, La Salle, Quebec, Canada, assignors to Go-Tract Limited, La Cedres, Quebec, Canada, a corporation of Canada
Filed Feb. 11, 1966, Ser. No. 526,912
Claims priority, application Great Britain, Nov. 26, 1965, 6,940/65
10 Claims. (Cl. 180—6.7)

This application is a continuation-in-part of my copending application Ser. No. 440,529, filed Mar. 17, 1965.

This invention concerns a track-laying vehicle.

The tension in an endless track of a track-laying vehicle will vary in accordance with the direction of travel of the vehicle.

If, however, the tension in the endless track should rise or fall excessively, the track will either become too taut or too slack. Excessive slackness will enable the track to become easily de-railed and/or to override the teeth of the sprocket. On the other hand, unduly high tension in the track will cause overloading of the component parts of the track and this will cause these parts to wear and/or break more readily.

Moreover, as the track tension increases, so does the power required to drive the track. Thus if the tension in the track is too great, there is a larger power absorption by the track, with a corresponding loss of available propulsive power to move the vehicle over the ground.

According therefore to the present invention there is provided a track-laying vehicle comprising two endless tracks, tension adjustment means for adjusting the tensions in said tracks, and a vehicle steering mechanism which controls the tension adjustment means and which is settable to cause one of the endless tracks to move forwardly around an inner curved path and the other endless track simultaneously to move forwardly around an outer curved path, the vehicle steering mechanism, when so set, causing the tension adjustment means to ensure that the tension in the said one track is higher than that in the said other track.

The vehicle preferably comprises a gear mechanism for driving the vehicle forwardly and in reverse, the tension adjustment means also being controlled by the gear mechanism so that the tension in both tracks is higher when the vehicle is being driven in reverse than when it is being driven forwardly.

Each endless track may be entrained over a movable member which is moved by an hydraulic circuit which incorporates a pump for supplying hydraulic liquid under pressure to said ram.

There may be a plurality of valves, including at least one pressure relief valve, which can be positioned to control the maximum pressure in each said circuit to higher and lower values respectively, the vehicle steering mechanism bringing at least one of said valves in each said circuit into and out of control of said pressure as the vehicle steering mechanism is moved.

The valves in each circuit may include a control valve which controls the flow through a conduit leading to said ram, the control valve being settable by the vehicle steering mechanism in two positions in which it respectively establishes communication between the said conduit and one or other of the two ducts each of which extends to the delivery side of the pump, one only of said ducts having a pressure reducing means therein. A pressure relief valve may be provided to prevent the pump delivery pressure from exceeding a predetermined value. Means may be provided for preventing the pressure in the said one duct from exceeding a predetermined value. Means may also be provided for preventing the pressure in said conduit from exceeding a set value, the set value being higher than the said predetermined value. The last-mentioned means may, for example, comprise a non-return valve which permits flow only in a direction away from said ram and which is located in a drain passage communicating with the conduit leading to the ram.

The invention is illustrated, merely by way of example, in the accompanying drawings, in which:

FIGURES 1 and 2 are diagrammatic side elevations of a track laying vehicle which is not in accordance with the present invention but which shows the positions of an endless track thereof when the vehicle is respectively travelling forwardly and rearwardly.

FIGURE 3 shows the position of a portion of an endless track of the vehicle of FIGURES 1 and 2 when the latter is being reversed over an obstacle.

FIGURE 4 is a broken-away elevation, partly in section, of a track assembly for a track laying vehicle according to the present invention, the said track assembly including an idler wheel which is movable by a hydraulic ram.

FIGURE 5 is a diagrammatic view of an hydraulic circuit for operating the hylraulic ram shown in FIGURE 4, and FIGURE 6 is a diagram showing a wiring circuit for the operation of control valves shown in FIGURE 5.

In FIGURE 1 there is shown a known track-laying vehicle 10 having a body 11 and a driver's cabin 12.

On each of the opposite longitudinal sides of the vehicle 10 there is provided an endless track 13. Each endless track 13 has an upper run 14 which is entrained over a sprocket or end wheel 15 and over an idler or end wheel 16 which are respectively disposed at opposite ends of the upper run 14. Each of the endless tracks 13, moreover, has a lower run 20 which engages the ground and which is entrained over road wheels, 21, 22, 23, 24 (and, if desired, over a number of other road wheels (not shown)).

When the vehicle 10 is travelling forwardly, as shown in FIGURE 1, the portion 25 of each endless track between the rearmost road wheel 24 and the sprocket 15 is subjected to the most tension. The upper run 14, and the portion 26 of each endless track between the road wheel 21 and the idler wheel 16, is tensioned only to the extent caused by the catenary shape which the upper run 14 adopts between the sprockets 15 and idler wheel 16.

If, therefore, in accordance with the present invention, each idler wheel 16 is moved towards and away from its sprocket 15, by the means described in detail below, it may be arranged that the catenary form, and hence the tension in, the upper run 14 of each endless track 13 may be maintained substantially constant.

In FIGURE 2, the vehicle 10 is shown as travelling rearwardly, i.e. reversing, and it will be noted that the maximum tension in each endless track 13 occurs in its upper run 14 and in the portion 26 of the track.

When travelling rearwardly, the extra length of each endless track 13 that formed the catenary of the upper run 14 when the vehicle was running forwardly, now bulges out at the portion 25. As a result, when the vehicle 10 meets an obstacle 27 as shown in FIGURE 3, the portion 25 of each endless track is forced into a reverse bend, and is therefore excessively loaded, whereby the track may be damaged or its life may be decreased. Such a reverse bend may also cause the track to be derailed or misguided. Moreover, more power is required to lift the vehicle onto and over the obstacle 27 than would otherwise be the case, and in some instances, the vehicle 10 will be unable to surmont the obstacle 27.

This condition may, however, be corrected by moving the idler wheels 16 away from the road wheels 21 a sufficient distance to take up the slack in each endless track, and holding the idler wheels 16 in position against the higher track tension which is due to the power being transmitted by the sprockets 15.

In FIGURE 4 there is shown part of a track assembly, in accordance with the present invention, for the vehicle 10, the idler wheels 16 being movable towards and away from the sprockets 15.

Each idler wheel 16 is mounted on a spindle 29 which is carried at one end of a pivot arm 30 whose other end is rotatably mounted on a shaft 31 which is fixed (by means not shown) to the vehicle body 11.

A pivot pin 32 extends between a pair of lugs 33 (only one shown) which form part of each pivot arm 30. A hydraulic ram 34 has a piston rod 35 whose outer end is rotatable about the respective pivot pin 32. Each ram 34, at its end remote from its piston rod 35, is mounted on a pivot pin 36 which is carried by a bracket 37 fixed to the vehicle body 11. Thus, if the pressure of hydraulic fluid supplied to the rams 34 is respectively increased and decreased, the idler wheels 16 will be respectively moved further away from and towards their sprockets 15.

When the vehicle 10 is travelling forwardly around a bend, one of the endless tracks 13 will move around an inner curved path, while the other endless track 13 will move around an outer curved path. The endless track 13 which moves around the inner curved path moves at lower speed and covers a shorter distance than the endless track 13 which moves around the outer curved path. The vehicle body travels at the mean speed of the two tracks relative to the ground. Thus, the inner track travels in reverse relative to the body of the vehicle, and even though still travelling forward, the effect on the idler wheel 16 of the inner track is the same as if the vehicle were travelling in reverse. This produces a high load on the respective idler wheel 16, moving it towards the respective sprocket 15, with consequent track slackness and risk of derailment of the inner track.

These disadvantages may, however, be avoided by arranging that the tension in the endless track which moves forwardly around the inner curved path is higher than in the endless track which moves forwardly around the outer curved path. One way in which this may be achieved is by employing the hydraulic circuit shown in FIGURE 5 for operating the rams 34.

Referring to FIGURE 5, a fixed or variable displacement engine-driven pump 80 is arranged to pump hydraulic liquid from a tank 81 to a duct 82. A medium pressure relief valve 83 is provided which communicates with the duct 82 and which prevents the delivery pressure of the pump 80 from exceeding a predetermined value.

The duct 82 communicates with ducts 84, 85 which are arranged in parallel, the duct 84 having branches 86, 87 which extends to ports 88, 89 respectively in the bodies of control valves 90, 91 respectively. The duct 85 has branches 94, 95 which respectively extend to ports 96, 97 in the bodies of the control valves 90, 91.

The duct 84 has a pressure reducing valve 100 connected therein. A drain cock 101 communicates with the duct 84 so that, when manually opened, the rams 34 may retract to permit track repair or replacement.

Non-return valves 102, 103 are respectively connected in the branches 94, 95 to ensure that flow therethrough can occur only towards the control valves 90, 91.

When the control valves 90, 91 are in the positions shown in FIGURE 5, the branches 86, 87 are respectively in communication with conduits 104, 105 each of which leads to one of the rams 34, the control valves 90, 91 at this time preventing flow through the branches 94, 95. The control valves 90, 91 are, however, two-position valves which may be set in another position, not shown, in which the control valves 90, 91 permit communication between the conduits 104, 105 and the branches 94, 95, while preventing flow through the branches 86, 87.

A drain passage 106 extends between and communicates with the conduits 104, 105. A high pressure relief valve 107 is connected in the drain passage 106 to prevent the pressures in the conduits 104, 105 from exceeding a set value, the said set value being thus higher than the said predetermined value which is set by the medium pressure relief valve 83.

Non-return valves 110, 111 are connected in the drain passage 106 on opposite sides of the high pressure relief valve 107, the non-return valves 110, 111 permitting flow only in directions towards the high pressure relief valve 107 and thus in directions away from the rams 34.

Each of the control valves 90, 91 is urged towards the position shown in FIGURE 5 by a spring (not shown) but is movable towards its other position by solenoids 112, 113 respectively. The solenoids 112, 113 are respectively connected in earth return circuits 114, 115 (FIGURE 6) which are connected in parallel to a battery 116 or other source of electrical energy.

The circuits 114, 115 respectively incorporate normally open single pole switches 116, 117 which are opened and closed by a steering mechanism which may, as indicated schematically, include steering brake levers 118, 119 or a wheel (not shown) or a tiller (not shown). Steering mechanisms for track laying vehicles are well known in the art, and any conventional mechanism may be used. A tiller mechanism is exemplified in U.S. Patent 2,044,306.

The circuits 114, 115 respectively have portions 120, 121 which are connected between opposite sides of the switches 116, 117 respectively. The circuits through the portions 120, 121 are opened and closed by a normally open double pole switch 122 a portion of which is engageable by a gear selector lever 123 when reverse gear is selected. Systems for actuating a device in accordance with gear lever positions within a gear box are well known in the art as shown by the Henschkel Patent 2,264,441.

Accordingly, when the vehicle 10 is travelling straight forward, the switches 116, 117, 122 are all open and the solenoids 112, 113 are de-energised. The control valves 90, 91 are therefore in the positions shown in FIGURE 5 in which the duct 84, in which is connected the pressure reducing valve 100, communicates with the conduits 104, 105 leading to the rams 34. The hydraulic pressure applied to the latter will therefore be at a predetermined value set collectively by the medium pressure relief valve 83 and by the pressure reducing valve 100.

If at this time there is any external load on the idler wheel 16 of one or both endless tracks 13 and this external load is high enough to produce a back pressure in the hydraulic liquid which is higher than the predetermined pressure referred to in the preceding paragraph, then pressure fluid will flow through a case drain (not shown) of the pressure reducing valve 100 to tank until the pressure falls to the said predetermined pressure, whereby the idler wheels 16 will move so as to relieve the said excessive tension.

When the gear selector lever 123 is placed in reverse, however, this causes the double pole switch 122 to be closed, with consequent energisation of the solenoids 112, 113. Each of the control valves 90, 91 is therefore moved to its other position in which the duct 85 communicates with the conduits 104, 105. The hydraulic pressure applied to the rams 34 will therefore be raised to a set value determined by the medium pressure relief valve 83 only.

If there is at this time any external load on the idler wheel 16 of one or both endless tracks 13 and this external load is high enough to produce a back pressure in the hydraulic liquid which is higher than the set pressure referred to in the preceding paragraph, this will effect closure of one or both (as the case may be) of the non-return valves 102, 103 so as to prevent this higher pressure from being applied to the medium pressure relief valve 83 or to the pressure reducing valve 100 or to the other control valve and ram. However, if this higher pressure is sufficiently high, one or both (as the case may be) of the non-return valves 110, 111 will open, and hydraulic liquid will pass through the high pressure relief valve 107 to drain, whereby the excessive tension in the respective endless track or tracks will be relieved.

It should be noted that a high external load on one endless track 13 only will cause the respective non-return valve 110, 111 to be open and the other to be closed, so that the ram 34 of the endless track which is not affected by the load will still be supplied with hydraulic liquid at the pressure set by the medium pressure relief valve 83.

When the vehicle is travelling forwardly around a leftward bend, the switches 117, 122 will remain open but the switch 116 will be closed by the lever 118. The solenoid 112 will therefore be energised and the control valve 90 will be placed in the position in which it establishes communication between the conduit 104 and the duct 85. The pressure in the conduit 104 will therefore be raised to the value set by the medium pressure relief valve 83, while the pressure in the conduit 105 will remain at that set by the pressure reducing valve 100. The endless track 13 which is moved around the inner curved path towards the left will therefore be tensioned more highly than the other endless track 13 which is moved around the outer curved path.

Similarly, when the vehicle is travelling forwardly around a rigthward bend, the switches 116, 122 will remain open, but the switch 117 will be closed. The pressure in the conduit 105 will therefore be raised without a corresponding rise in the pressure in the conduit 104.

The control valves 90, 91, instead of being moved by electrically actuated means, may alternatively be moved by mechanically, hydraulically or pneumatically actuated means.

Should for some reason higher track tension be required than the pressure reducing valve 100 permits in forward running, the operator can induce this by slightly moving the steering levers and thereby energizing both solenoids 112, 113 and so raising the system pressure to that which is applied in reverse driving, without yet actuating the steering mechanism.

The hydraulic circuit illustrated in FIGURE 5 may, if desired, be modified so that the medium pressure set by the medium pressure relief valve 83 is employed not only during reversing and turning around a bend, but also when the gear selector or shift mechanism is placed in neutral.

Indeed the said medium pressure may also be employed in the lower forward gear or gears, the lower pressure set by the pressure reducing valve 100 in this case being used only in the higher forward gear or gears.

The rams 34, instead of being connected in hydraulic circuits as shown in FIGURE 5, may be double-acting rams opposite faces of which are supplied with a pressure fluid. When low tension is required in the respective endless track, the pressures applied to the said opposite faces may be arranged to be the same so that there will be a force acting towards the face whose area is reduced by the rod of the ram. When, however, high tension is required in the respective endless track, the pressure acting on the last-mentioned face is reduced, whereby the said force is increased.

We claim:

1. A track-laying vehicle comprising two endless tracks, end wheels about which each of said endless tracks are entrained, tension adjustment means connected with one end wheel of each of said tracks for adjusting the tensions in said tracks, and a vehicle steering mechanism which controls the tension adjustment means and which is settable to cause one of the endless tracks to move forwardly around an inner curved path and the other endless track simultaneously to move forwardly around an outer curved path, the vehicle steering mechanism, when so set, causing the tension adjustment means to ensure that the tension in the said one track is higher than that in the said other track.

2. A vehicle as claimed in claim 1 and including a gear selecting mechanism for driving the vehicle forwardly and in reverse, said tension adjustment means also being controlled by the gear selecting mechanism so that the tension in both tracks is higher when the vehicle is being driven in reverse than when it is being driven forwardly.

3. A vehicle as claimed in claim 1 in which said tension adjustment means includes an hydraulic ram for moving said one end wheel of each of said tracks, and a respective hydraulic circuit for each track which incorporates said ram and a pump for supplying hydraulic liquid under pressure to said ram.

4. A vehicle as claimed in claim 3 in which there are a plurality of valves, including at least one pressure relief valve, which can be positioned to control the maximum pressure in each said circuit to higher and lower values respectively, the vehicle steering mechanism bringing at least one of said valves in each said circuit into and out of control of said pressure as the vehicle steering mechanism is moved.

5. A vehicle as claimed in claim 4 in which the valves in each said circuit include a control valve which controls the flow through a conduit leading to said ram, the control valve being settable by the vehicle steering mechanism in two positions in which it respectively establishes communication between the said conduit and a selected one of two ducts each of which extends to the delivery side of the pump, one only of said ducts having a pressure reducing means therein.

6. A vehicle as claimed in claim 5 in which a pressure relief valve is provided to prevent the pump delivery pressure from exceeding a predetermined value.

7. A vehicle as claimed in claim 5 in which means are provided for preventing the pressure in the said one duct from exceeding a predetermined value.

8. A vehicle as claimed in claim 7 in which means are provided for preventing the pressure in said conduit from exceeding a set value, the set value being higher than the said predetermined value.

9. A vehicle as claimed in claim 8 in which the last-mentioned means includes a non-return valve which permits flow only in a direction away from said ram, and a drain passage communicating with the conduit leading to the ram, the non-return valve being located in said drain passage.

10. A vehicle as claimed in claim 5 in which the vehicle has a gear mechanism by means of which the control valve is also settable in the said two positions.

References Cited

UNITED STATES PATENTS

| 2,373,316 | 4/1945 | Landy | 180—6.54 |
| 2,818,311 | 12/1957 | Ashley | 305—10 |
| 3,082,043 | 3/1963 | Orton | 180—9.2 X |
| 3,116,956 | 1/1964 | Maradyn | 305—10 X |

FOREIGN PATENTS 412,839   7/1934   Great Britain.

BENJAMIN HERSH, *Primary Examiner.*

RICHARD J. JOHNSON, *Examiner.*